July 8, 1969   G. GÄSSLER ET AL   3,454,754
ELECTRIC QUOTIENT NETWORK WHICH DIVIDES A VARIABLE AC INPUT
VOLTAGE BY A VARIABLE DC INPUT VOLTAGE
Filed Feb. 25, 1963
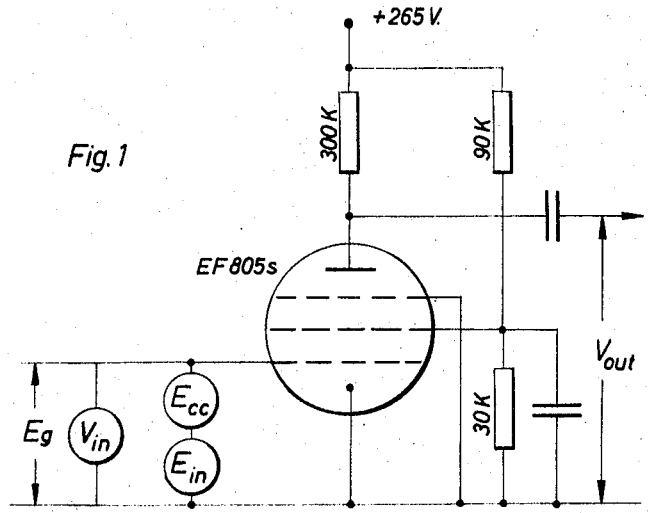
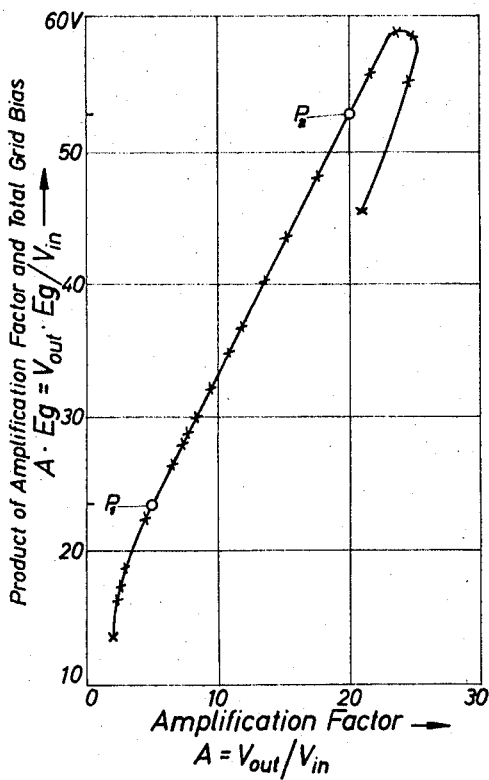
INVENTORS:
GERHARD GÄSSLER
FRIEDMAR PÖHLER
BY
ATTORNEYS

United States Patent Office 3,454,754
Patented July 8, 1969

3,454,754
ELECTRIC QUOTIENT NETWORK WHICH DIVIDES A VARIABLE AC INPUT VOLTAGE BY A VARIABLE DC INPUT VOLTAGE
Gerhard Gässler and Friedmar Pöhler, Leverkusen, Germany, assignors to Farbenfabriken Bayer Aktiengesellschaft, Leverkusen, Germany, a corporation of Germany
Continuation-in-part of application Ser. No. 753,368, Aug. 5, 1958. This application Feb. 25, 1963, Ser. No. 260,649
Claims priority, application Germany, Sept. 3, 1957, F 23,892
Int. Cl. G06g 7/16
U.S. Cl. 235—196    3 Claims This invention relates to a voltage dividing network for supplying an output voltage proportional to the quotient of two input voltages and, more particularly, to an improved and simplified voltage dividing network of this type particularly advantageous in the conversion of measurement values in measuring instruments.

The present application is a continuation-in-part of our application Ser. No. 753,368, filed Aug. 5, 1958, for "Electric Quotient Network."

In prior art voltage dividing networks of this general type, the variable transconductance of a regulating valve has been utilized in such a manner that one of the two output voltages, is applied as a feedback and used to determine the operating point of the regulating valve on its characteristic curve. These prior art arrangements have the disadvantages that two separate AC voltages are required or must be produced for the input voltages. Furthermore, an isolating or separating network must be provided, and in most cases, amplifier stages must be arranged in series at the output of the regulating valve in order to produce the necessary control voltage.

In accordance with the invention, it has been found that the disadvantages of prior art systems may be obviated by adding, to the two input voltages applied to the control grid of the regulating valve, a constant DC voltage having a value and a relation to the grid input voltages determined by plotting the product of the amplification factor of the tube and the total input grid voltage as a function of the amplification factor of the tube. This characteristic curve will correspond to an equation in which the product of the amplification factor and the total grid bias is equal to a constant plus the product of the amplification factor and the constant portion of the grid bias voltage. Between two points on this curve, over a 4 to 1 range of amplification in which the amplification factor is greater than one, the characteristic curve will be a straight line. By utilizing the straight line portion of this curve, and the above-mentioned equation, the requisite constant grid bias to be added to the two variable input voltages to obtain operation of the valve over the straight line portion of the characteristic curve can be determined. When the regulating valve, preferably a pentode, is operated with the thus determined constant portion of the grid bias, the output voltage of the regulating valve will be proportional to the quotient of the two input voltages. For example, it will be proportional to an input AC voltage divided by an input DC voltage.

For an understanding of the principles of the invention, reference is made to the following description of a typical embodiment thereof as illustrated in the accompanying drawings.

In the drawings:

FIG. 1 is a schematic wiring diagram of one form of voltage dividing network embodying the invention; and FIG. 2 is a graph of the characteristic curve of the regulating valve shown in FIG. 1, with the product of the amplification factor and the total grid bias plotted as a function of the amplification factor, which latter is variable over the input voltage range.

The output voltage of an electric network is proportional to the quotient of two input voltages when the operation of the network is effective to establish, between the amplitudes of the respective output and input voltages, a relation which can be expressed mathematically as follows:

(1) $\quad V_{out} = C \cdot V_{in}/E_{in}$ where $V_{in}$ = peak amplitude of variable AC input voltage
$E_{in}$ = DC input voltage
$V_{out}$ = peak amplitude of AC output voltage
$C$ = constant variable with voltage value The two input voltages from whose amplitudes the quotient is to be derived are generally a relatively small AC input voltage and a relatively larger DC input voltage. In accordance with the invention, it has been found that a voltage divider and amplifier network, including a regulating valve, can be used to provide a four-terminal network by which Equation 1 may be satisfied.

Thus, and referring particularly to FIG. 1, an amplifier network is illustrated as consisting of a pentode of the EF805s type associated with a resistance and a capacitance network. The control grid of this amplifier has applied thereto a total grid bias $E_g$. This total grid bias comprises the sum of a constant DC grid bias $E_{cc}$, a relatively small input AC voltage $V_{in}$, and a relatively larger input DC voltage $E_{in}$. These several voltages are applied between the control grid and the cathode of the amplifier tube. The output voltage is derived between the anode and cathode of the amplifier valve, and is denoted by $V_{out}$. In accordance with the invention, this output voltage ($V_{out}$) represents the quotient of the input AC voltage $V_{in}$ and the input DC voltage $E_{in}$.

A valve type amplifier stage establishes, between the input AC voltage and the output AC voltage, a relation corresponding to the following equation:

(2) $\quad V_{out} = A \cdot V_{in}$ where $A$ = amplification factor.

The relation set forth in Equation 2 provides the desired relation of Equation 1 when the following equation can be satisfied:

(3) $\quad A = C/E_{in}$

It is known that the grid bias on the control grid of a valve type amplifier stage can comprise a constant DC voltage $E_{cc}$ and a variable input DC voltage $E_{in}$. This can be expressed mathematically as follows:

(4) $\quad E_g = E_{in} + E_{cc}$ where $E_g$ = total grid bias
$E_{cc}$ = constant position of $E_g$
$E_{in}$ = variable position of $E_g$ = DC input voltage By combining Equation 3 with Equation 4, the following relation can be established as a requirement for the amplification factor A:

(5) $\quad A \cdot E_g = C + A \cdot E_{cc} = E_{cc} \left[ \dfrac{C}{E_{cc}} + A \right]$ Inasmuch as, in the case of a pentode, (6) $\quad A = G_m \cdot Z_1$ where $G_m$ = transconductance of valve
$Z_1$ = external resistance of valve and (5a) $$G_m \cdot E_g = E_{cc}\left[\frac{C}{E_{cc}} \cdot Z_1 + G_m\right]$$

In Equation 5 or 5a, the product of the amplification factor and the total grid bias, or the product of the transconductance and the total grid bias, are linear fractions of the amplification factor A or of the transconductance $G_m$, respectively. Since either Equation 5 or Equation 5a is a linear function, either can be utilized as a simple criterion of the stability of an amplifier valve circuit for use as a voltage divider or quotient providing network.

More particularly, the range within which the valve will so operate as a quotient determining network can be determined. Thus, if the amplification factor A or the transconductance $G_m$ is determined as a function of the total grid bias $E_g$ and if, for each such determination, the product of the amplification factor and the total grid bias, or of the transconductance and the total grid bias, is plotted as a function of either the amplification factor A or the transconductance $G_m$, respectively, the useful range of operation is a straight line.

By observation of the thus plotted graph, the limits of the straight line portion thereof may be determined. If the lower and upper limits of the straight line portion are designated by the indices 1 and 2, they may be introduced into either Equation 5 or Equation 5a and the requisite value of the constant portion $E_{cc}$ of the grid bias can be readily calculated. Thus, this constant portion of the grid bias may be determined from the following equation:

(7) $$E_{cc} = \frac{(A \cdot E_g)_1 - (A \cdot E_g)_2}{A_1 - A_2}$$

Also, the variable DC component of the grid bias of the lower operating point may be determined from the following equation:

(8) $$(E_{in})_1 = \frac{(A \cdot E_g)_1 \frac{A_2}{A_1} - (A \cdot E_g)_2}{A_2 - A_1}$$

By way of an example of the foregoing, the characteristic curve of the valve EF805s illustrated in FIG. 1 has been plotted in FIG. 2. It will be noted that the useful control range, or the straight line portion of the curve, extends between points $P_1$ and $P_2$ which in turn extends between an amplification factor of 5 and an amplification factor of 20. That is, it extends through a 4 to 1 range of amplification factors, and in which range the amplification factor is greater than 1. Utilizing the curve of FIG. 2 and Equations 7 and 8, the constant portion $E_{cc}$ of the grid bias has been found to be 1.93 volts and the variable DC input component $(E_{in})_1$ of the grid bias was found to be 0.72 volt.

To summarize, the invention may be said to comprise a voltage divider network for deriving an output voltage which is a function of the quotient of a variable AC input voltage divided by a variable DC input voltage and comprising an amplifier valve, means for applying the variable AC voltage to the grid of the valve, means for applying the variable DC voltage to the grid of the valve and means for applying, to the grid of the valve, a constant DC bias whose value is determined by plotting the product of the amplification factor of the amplifier and the total grid bias thereof as a function of the amplification factor to obtain a curve having a straight line portion between two points, and deriving the constant DC bias from an equation representing the difference between the product of the amplification factor and the total grid bias at each of the two points divided by the difference between the amplification factor at each of the two points. The latter equation is given above as Equation 7.

It should be noted, however, that it is possible not only to provide with the invention voltage divider network an output voltage, which is a function of the quotient of the amplitudes of a variable AC input voltage and a variable DC input voltage, but also, if appropriate conversion of voltages is effected in advance of the input of the amplivoltages is effected in advance of the input of the amplifier valve, the quotient of the amplitude of two variable AC voltages or of two variable DC voltages.

While specific embodiments of the invention has been shown and described in detail to illustrate the application of the principles of the invention, it will be understood that the invention may be embodied otherwise without departing from such principles.

What is claimed is:

1. A voltage divider network for delivering an output voltage which is a function of the quotient of a variable AC input voltage divided by a variable DC input voltage, which network comprises a single stage pentode amplifier having a single pentode valve, a first circuit means coupled to the control grid and to the cathode of said pentode valve to apply between said control grid and cathode, a variable AC input voltage representing the dividend, a second circuit means for delivering a variable DC input voltage representing the divisor, and a third circuit means for delivering a constant DC bias voltage $E_{cc}$ related to the product of the amplification factor and total grid bias versus amplification factor characteristic curve for said pentode amplifier by the equation:

$$E_{cc} = \frac{(A \cdot E_g)_1 - (A \cdot E_g)_2}{A_1 - A_2}$$

wherein $(A \cdot E_g)_1$ and $(A \cdot E_g)_2$ are the amplification factor and total grid bias product values of said characteristic curve at respectively distinct points 1 and 2 thereon corresponding respectively to amplification factor values $A_1$ and $A_2$, said second and third circuit means being coupled to each other, and coupled one to said cathode and the other to said control grid to apply to said control grid with respect to said cathode, a total grid bias voltage $E_g$ which is the sum of the variable DC input voltage delivered by said second circuit means, and the constant DC bias voltage $E_{cc}$ delivered by said third circuit means to derive at the anode of said pentode valve an output voltage with respect to the cathode which is a function of the quotient of said variable AC input voltage divided by said variable DC input voltage.

2. The voltage divider network according to claim 1 wherein said amplification factor values $A_1$ and $A_2$ represent an amplification factor range of approximately 4:1.

3. The voltage divider network according to claim 2 wherein said amplification factor values $A_1$ and $A_2$ are, respectively 5 and 20.

References Cited

UNITED STATES PATENTS 2,763,838   9/1956   McConnell _____ 235—196 X
2,848,161   8/1958   Woll _____ 328—160 X MALCOLM A. MORRISON, *Primary Examiner.*

JOSEPH F. RUGGIERO, *Assistant Examiner*

U.S. Cl. X.R.

328—161